Patented Apr. 17, 1928.

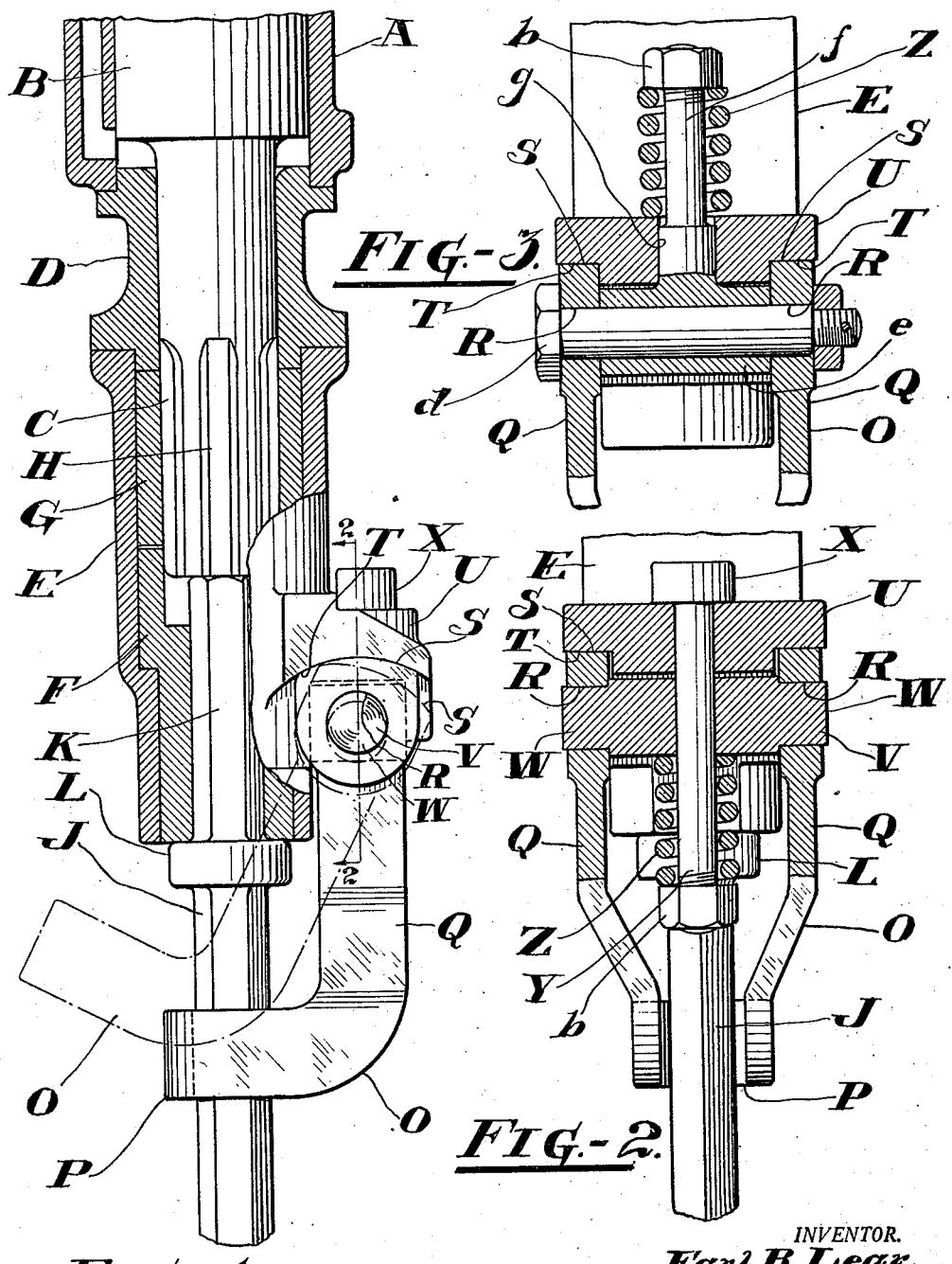

1,666,176

UNITED STATES PATENT OFFICE.

EARL B. LEAR, OF PHILLIPSBURG, NEW JERSEY, ASSIGNOR TO INGERSOLL-RAND COMPANY, OF JERSEY CITY, NEW JERSEY, A CORPORATION OF NEW JERSEY.

STEEL RETAINER FOR ROCK DRILLS.

Application filed June 16, 1927. Serial No. 199,258.

This invention relates to rock drills, but more particularly to a steel retainer for fluid actuated rock drills of the type in which the working implement is disposed loosely in the front end of the drill.

The objects of the invention are to retain the drill steel in the front head of the drill and to construct a retainer which comprises only a few simple parts capable of being readily assembled on the front head and removed therefrom.

Other objects will be in part obvious and in part pointed out hereinafter.

The invention is shown in one of its preferred forms in the accompanying drawings, in which Figure 1 is a sectional elevation of the front end of a rock drill having the invention applied thereto, Figure 2 is a side view in elevation partly in section taken through Figure 1 on the line 2—2 looking in the direction indicated by the arrows, and Figure 3 is a view similar to Figure 2 showing a modification of the invention.

Referring to the drawings, A represents a cylinder of a rock drill in which is disposed a reciprocatory hammer piston B having a fluted forward extension C. A front cylinder extension D forms a closure for the front end of the cylinder A and is bored to slidably receive the extension C of the piston.

Connected to the front end of the cylinder extension D, as by means of the usual side bolts (not shown), is a front head E which acts as a housing for the chuck mechanism, comprising, in this instance, a chuck F disposed rotatably in the front head. The chuck F is suitably interlocked with a fluted chuck nut G which interlocks slidably with flutes H in the piston extension C in a well known manner for imparting rotary movement of the piston to the chuck parts.

Disposed in the chuck F is a working implement or drill steel J, the shank K of which extends into the path of the hammer piston to receive the blows thereof. At the juncture of the drill steel J and the shank K is formed a collar L which abuts the front end of the chuck F for limiting the distance which the shank K may extend into the chuck F.

In accordance with the present invention, means are provided for preventing ejection of the working implement J from the front head. To that end a retainer O comprising a yoke P and side arms Q is so disposed with respect to the front head E that in the operative position of the retainer, the yoke P encircles the drill steel J at a point sufficiently forwardly of the collar L to permit of considerable longitudinal movement of the drill steel. The side arms Q extend in a rearwardly direction and are provided near the rearward free ends with apertures R. On the rearward ends of the side arms Q are curved surfaces S which conform to curved surfaces T on opposite sides of and on the forward surface of an enlargement U located on the side of the front head E and preferably near the front end thereof. The apertures R in this instance are located eccentrically with respect to the curved end surfaces S of the side arms.

In order to form a pivot for the retainer O, a pin V is disposed forwardly of the enlargement U and extends transversely with respect to the front head. The ends W of the pin V extend into the apertures R and are of slightly smaller diameter than the body portion of the pin.

Suitable means are provided for yieldably securing the retainer O to the enlargement U and also to form a guide for the pin V so that the retainer yoke P will at all times be held substantially concentrically with respect to the working implement J. To that end a bolt X is disposed slidably through the enlargement U and the said pin V between the side arms Q and is of such length that its lowermost or front end Y extends a sufficient distance forwardly of the pin for the reception of a cushioning spring Z. The cushioning spring Z in this instance bears at one end on a nut $b$ screwed on the end of the bolt and with its other end on the pin V against which it exerts a pressure to force the end surfaces S of the side arms firmly against the seating surfaces T to hold the retainer O in the operative position.

In assembling the device on the front head, the side arms Q of the retainer O may first be spread a sufficient distance to enable the ends W of the pin V to be inserted in the apertures R. After these parts have been thus assembled, the yoke may be placed in the operative position on the front head and after the bolt X has been inserted into the enlargement and the pin V, the spring Z may be placed on the bolt and the nut $b$ screwed on the bolt to a position which will set up the required tension in the spring Z to hold the cooperating surfaces of the side arms and of the enlargement firmly together.

Whenever it is desired to remove the drill steel J from the front head E, the retainer O may be rocked to the position indicated in dot and dash lines in Figure 1. In this position the yoke P of the retainer will have been moved to one side of the collar L of the drill steel and the drill steel may then be freely withdrawn from the front head. In the inoperative position of the retainer O, the said retainer will also be held securely in the releasing position by the spring Z. After another drill steel has been inserted in the front head, the retainer O may again be rocked to its initial position wherein it will be securely held by the spring Z against the effects of vibration and jars caused by the reciprocation of the hammer piston B.

Referring now to the modification shown in Figure 3, the front head E, the enlargement U and the yoke O are in all essential respects similar to the corresponding elements shown in the modification described in connection with and as shown in Figures 1 and 2. In the present instance the retainer O is pivoted on a bolt $d$ which extends through the apertures R of the side arms Q. The bolt $d$ in this instance is supported by a head $e$ of a bolt $f$ extending slidably through an aperture $g$ in the enlargement U. The head $e$ is preferably, though not necessarily, of such width that its ends abut the inner surfaces of the side arms Q. As will be observed, the bolt $f$ extends rearwardly of the enlargement U a sufficient distance to receive a cushioning spring Z which seats with its front end on the enlargement U and with its rearward end on a nut $b$ screwed on the end of the bolt $f$.

In assembling the device described in this modification, the head $e$ of the bolt $f$ may first be placed in position between the side arms Q to receive the bolt $d$. After these parts have been thus assembled, the bolt $f$ may be disposed in the aperture $g$ of the enlargement U and after the spring Z has been placed on the bolt $f$, the nut may be screwed on the end of the bolt $f$ to a point thereon which will set up the desired tension in the spring Z.

I claim:

1. A steel retainer for a rock drill, comprising in combination a front head, an enlargement on the front head having seating surfaces on one side thereof, a floating pin beneath the enlargement and extending transversely of the front head, means for guiding the pin, a retainer pivoted on the pin having end surfaces shaped to conform to the seating surfaces, and a spring on the said guiding means exerting a pressure on the pin for holding the end surfaces firmly against the seating surfaces.

2. A steel retainer for a rock drill, comprising in combination a front head, an enlargement on the front head having curved seating surfaces on one side thereof, a floating pin beneath the enlargement and extending transversely of the front head, one bolt associated with the pin and the enlargement for guiding the pin, a yoked retainer pivoted on the pin having curved end surfaces on each side of said means seating on the seating surfaces, and a spring on the said guiding means exerting a pressure on the pin for holding the end surfaces firmly against the seating surfaces.

3. A steel retainer for a rock drill, comprising in combination a front head, an enlargement on the front head having curved seating surfaces on one side thereof, a floating pin forwardly of the enlargement and extending transversely thereof, a bolt associated with the pin and the enlargement for guiding the pin, a retainer comprising a yoke and side arms, said side arms being disposed on opposite sides of the bolt and having apertures in their free ends to pivotally receive the pin, curved end surfaces on the side arms bearing against the seating surfaces, said end surfaces being located eccentrically with respect to the pin, and a spring on the guiding means exerting a pressure to hold the end surfaces firmly against the seating surfaces.

In testimony whereof I have signed this specification.

EARL B. LEAR.